United States Patent [19] [11] 4,192,660
Ishidera et al. [45] Mar. 11, 1980

[54] AIR CLEANER INCLUDING NOISE-LIMITING COOL AIR INTAKE NOSE

[75] Inventors: Takashi Ishidera, Aichi; Masahiko Enjoji, Toyota, both of Japan

[73] Assignee: Toyota Jidosha Kogyo Kabushiki Kaisha, Aichi, Japan

[21] Appl. No.: 897,596

[22] Filed: Apr. 19, 1978

[30] Foreign Application Priority Data

Apr. 20, 1977 [JP] Japan ................................ 52-48901

[51] Int. Cl.[2] ............................................ B01D 46/02
[52] U.S. Cl. ...................................... 55/276; 181/229
[58] Field of Search ................ 55/276, 419, DIG. 28, 55/418; 181/206, 229, 236, 241, 252, 266, 286; 261/63

[56] References Cited

U.S. PATENT DOCUMENTS

| | | | |
|---|---|---|---|
| 2,403,699 | 7/1946 | Wilson | 181/241 |
| 2,949,165 | 8/1960 | Morrish et al. | 181/226 |

FOREIGN PATENT DOCUMENTS

| | | | |
|---|---|---|---|
| 1098730 | 2/1961 | Fed. Rep. of Germany | 181/206 |
| 891757 | 3/1962 | United Kingdom | 181/229 |

*Primary Examiner*—David L. Lacey
*Attorney, Agent, or Firm*—Browdy and Neimark

[57] ABSTRACT

A device which eliminates an intake sound from an air cleaner nose from being confined in the cabin of a car and more specifically pertains to a noise-limiting device which converts the intake sound into such a sound that is not amplified to the interior of a car, comprises a tuning hole at the tip of a cool air intake nose extending from the air cleaner nose.

4 Claims, 7 Drawing Figures

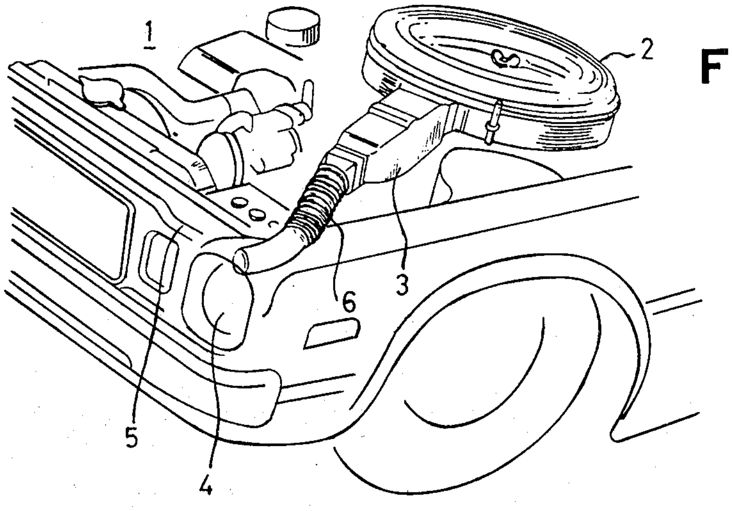
Fig. 1
PRIOR ART
Fig. 2
PRIOR ART
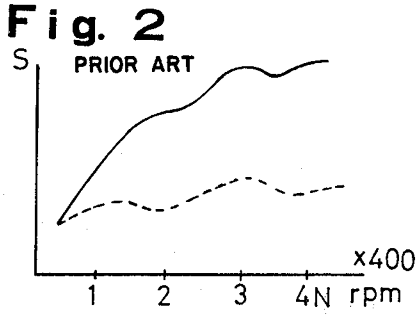
Fig. 3
PRIOR ART
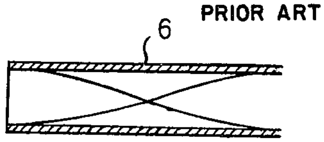
Fig. 4a
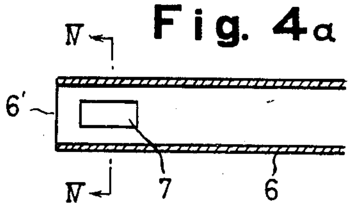
Fig. 4b
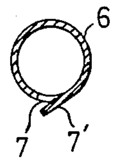
Fig. 6
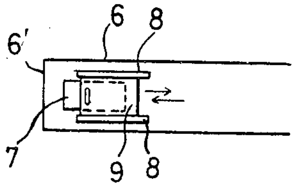
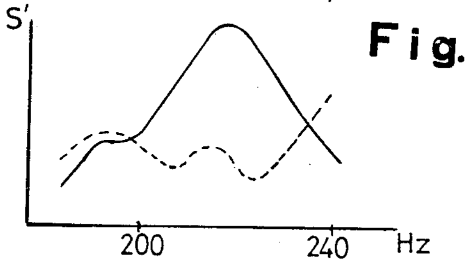
Fig. 5

AIR CLEANER INCLUDING NOISE-LIMITING COOL AIR INTAKE NOSE

BACKGROUND OF THE INVENTION

Along with safety driving measures of cars, pleasant driving also has been one of the current issues. Among such problems there has been raised the problem of an offensive noise that is produced within the cabin of the car when air is drawn into the nose of an air cleaner in the engine compartment. It has been determined that the indoor acoustic characteristics of a car, for example, the acoustic characteristics in the right and left directions, is constant, and remarkably affected by the primary and secondary components of explosion as the secondary component of the revolution of the engine.

The influence of the abovementioned first component has been reduced to some extent nowadays by elongating the air cleaner nose and making its section smaller.

On the other hand, in order to cope with the exhaust gas regulation as one of counter-measures of environmental pollution due to the cars, there has been employed a cool air intake system which includes, as shown in FIG. 1, a cool air intake nose 6 of which base portion is fastened to the nose 3 of the air cleaner 2 inside the engine compartment 1 and interposed between said nose 3 and the front frame 5 in the proximity of the head lamp 4. This exhibits a supplementary effect on the abovementioned intake noise.

The provision of this cool air intake nose 6 provides a sufficient effect as shown by curves in FIG. 2 wherein the number of revolutions N of the engine (the aforementioned explosion primary component) and the noise level S are respectively plotted on the abscissa and the ordinate, and the full line representing the use of the cool air intake nose 6 clearly demonstrates drastic increase in the noise in comparison with the dotted line representing the non-use of the same.

However, the size of the engine room 1 of a car is predetermined in accordance with the model of the car and the space for extending the cool air intake nose is therefore limited substantially to a predetermined distance because the engine room is stuffed with a battery, lamps and other associated instruments and components, to say nothing of the engine itself.

Consequently, air column resonance of a half wavelength is freshly generated in the cool air intake nose 6 as illustrated in FIG. 3, and matches with the aforementioned indoor acoustic characteristics and produces a confined noise inside the cabin.

As mentioned above, however, there is hardly any room inside the engine room for changing the length, size and position of the cool air intake nose 6.

It has been confirmed that the problem of noise amplification from the cool air intake nose occurs especially in cars having a four-cylinder engine and the like, and is particularly acute when the number of revolutions of the engine reaches 3,000 r.p.m., for example.

SUMMARY OF THE INVENTION

It is therefore an object of the present invention to solve the problem of the indoor noise arising from the air column resonance in the abovementioned cool air intake nose.

It is another object of the present invention to provide a novel noise-limiting cool air intake nose which, though simple in its construction, is capable of reducing the indoor noise by its rational design wherein a tuning hole is bored at the tip of the cool air intake nose to reduce the noise.

BRIEF DESCRIPTION OF THE DRAWINGS

FIG. 1 is a schematic view showing an engine equipped with a typical cool air intake nose;

FIG. 2 is a diagram showing the relation between the number of revolution of the engine and the noise level in accordance with presence and absence of the cool air intake nose in the prior art;

FIG. 3 is a schematic view showing the occurrence of air column resonance in the cool air intake nose of the prior art;

FIG. 4*a* is a schematic view showing the tuning hole in section bored at the tip of a cool air intake nose in accordance with the present invention;

FIG. 4*b* is a sectional view taken along line IV—IV of FIG. 4*a;*

FIG. 5 is a diagram showing the relation between the secondary frequency of the engine explosion and the sound pressure level in accordance with presence and absence of the tuning hole; and FIG. 6 is a schematic view showing another embodiment of the invention.

DETAILED DESCRIPTION OF PREFERRED EMBODIMENT

In accordance with the construction of the present invention for accomplishing the aforementioned objects, the external air is drawn into the air cleaner from the cool air intake nose opening at the front frame of a car and then fed into the engine whereby the resonance frequency of the air column occurring in the cool air intake nose is deviated and differentiated from the indoor acoustic characteristics, thereby making it possible to reduce the noise characteristics.

Next, an embodiment of the present invention will be explained on the basis of FIG. 1 in conjunction with FIG. 4*a* et seq in which like reference numerals are used to identify like elements as in FIG. 1.

As described already, the cool air intake nose 6 is provided and interposed between the nose 3 of the air cleaner 2 set at a predetermined position inside the engine room 1 and the front frame 5 near the head lamp, and caused to draw the external air. The base portion of the intake nose 6 is fastened to the air cleaner nose 3.

A tuning hole 7 of a predetermined size is provided, e.g. cut or bored, on the lower surface near the tip 6' of the cool air intake nose 6. In the embodiment shown in FIGS. 4*a* and 4*b*, the slit blade section 7' is downwardly open and functions as a kind of a covering member.

When the engine is driven in the abovementioned construction, the cool external air is sucked into the cool air intake nose 6 from the front frame 5, enters the air cleaner 2 through the nose 3 and is supplied into the engine.

During the abovementioned intake process, there occurs air column resonance of a half wavelength inside the cool air intake nose 6. By the action of the abovementioned tuning hole 7, however, the frequency of the air column resonance is changed so that there is no matching with the indoor acoustic characteristics whereby no amplification occurs. Accordingly, the action of the noise inside the cabin is reduced to a marked extent or substantially eliminated.

Experiments reveal that when the engine explosion secondary frequency (HZ) and the sound pressure level S' are respectively plotted on the abscissa and the ordinate, there is obtained the noise characteristics having a peak at the time of full acceleration as indicated by the full line in FIG. 5 if the tuning hole 7 is not provided on the cool air intake nose 6, whereas the noise level is extremely low, though varying to certain extents depending on the secondary frequency, if the tuning hole 7 is provided.

Since the tuning hole 7 is in the lower surface, the nose 6 is free from possible invasion of dust and dirt during driving of the car, and the covering 7', if provided, further prevents invasion of water, etc. from below.

Optimum design of the tuning hole such as its size and position can be experimentally determined depending on the model of the car. It is also possible to adjust the size of the tuning hole by forming guide rails 8, 8 along the tuning hole 7 so as to move a slide cover 9 back and forth.

As described above, in accordance with the present invention, the tuning hole near the intake edge of the cool air intake nose interposed between the front frame and the air cleaner set in the engine compartment of the car, deviates the frequency of the air column formed inside the cool air intake nose and thus prevents air column resonance.

Accordingly, the intake noise does not match with the indoor acoustic characteristics and the cool air intake noise which would otherwise have been generated in the car cabin is eliminated, thus reducing the noise effectively.

In addition, the construction of the invention is extremely simple. That is to say, all that is necessary is to bore the tuning hole near the tip of the cool air intake nose that is factory-set. Hence, this construction does not particularly lead to the increase in the cost of production and can be produced extremely easily. It is another advantage of the construction that it does not call for maintenance.

What is claimed is:

1. In a combined air cleaner and cool air intake pipe for a carburator of an internal combustion engine for use within an engine compartment of an automobile, said air cleaner comprising an air inlet, and said cool air intake pipe having front and back open ends and being connected at said back end to said inlet with the front end of said cool air intake pipe being adapted to be located at the front end of said engine compartment, the improvement comprising:

means to reduce noise within the automobile by reducing air column resonance within said cool air intake pipe including a tuning hole passing through the wall of said cool air intake pipe on the underside thereof and adjacent the front end thereof.

2. The combined air cleaner and air intake pipe in accordance with claim 1 further comprising means to partially cover said tuning hole.

3. The combined air cleaner and air intake pipe in accordance with claim 2 wherein said covering means comprises means to vary the size of said tuning hole, said means comprising a slidable cover plate.

4. The combined air cleaner and air intake pipe in accordance with claim 2 wherein said covering means comprises an extension of the wall of said cool air intake pipe, said extension being disposed from the circumference of said pipe to provide said tuning opening.

* * * * *